US 10,091,803 B2

(12) United States Patent
Wu

(10) Patent No.: US 10,091,803 B2
(45) Date of Patent: Oct. 2, 2018

(54) CHANNEL RESOURCE ALLOCATION METHOD AND COMMUNICATIONS DEVICE

(71) Applicant: Huawei Technologies Co., Ltd., Shenzhen (CN)

(72) Inventor: Tianyu Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 133 days.

(21) Appl. No.: 15/219,748

(22) Filed: Jul. 26, 2016

(65) Prior Publication Data
US 2016/0338085 A1 Nov. 17, 2016

Related U.S. Application Data

(63) Continuation of application No. PCT/CN2014/071575, filed on Jan. 27, 2014.

(51) Int. Cl.
*H04W 72/04* (2009.01)
*H04W 72/12* (2009.01)
(Continued)

(52) U.S. Cl.
CPC ... *H04W 72/1242* (2013.01); *H04W 72/0446* (2013.01); *H04W 72/1278* (2013.01); *H04W 74/0816* (2013.01); *H04W 84/12* (2013.01)

(58) Field of Classification Search
None
See application file for complete search history.

(56) References Cited

U.S. PATENT DOCUMENTS 8,724,611 B2 * 5/2014 Gupta ............... H04W 72/0406
370/346
9,854,449 B2 * 12/2017 Wu ...................... H04W 16/00
(Continued)

FOREIGN PATENT DOCUMENTS

| CN | 101321127 A | 12/2008 |
|----|-------------|---------|
| CN | 101978760 A | 2/2011 |

(Continued)

OTHER PUBLICATIONS

"IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 5: Enhancements for Higher Throughput", IEEE Computer Society, IEEE Std 802.11n-2009, Oct. 29, 2009, pp. 1-536.

(Continued)

*Primary Examiner* — Lonnie V Sweet
(74) *Attorney, Agent, or Firm* — Slater Matsil, LLP

(57) ABSTRACT

Embodiments disclose a channel resource allocation method and a communications device. The method includes acquiring, by a first device, scheduling information from an access point. The method also includes, if the first device is pre-scheduled by the access point according to the scheduling information to receive data from a second device in a first timeslot of a first channel, and before a start moment of data transmission time corresponding to the first timeslot of the first channel, sending, by the first device, a contention frame to contend for the first timeslot of the first channel.

20 Claims, 7 Drawing Sheets

20

A first device acquires scheduling information from an access point ~201

If the first device is pre-scheduled by the access point according to the scheduling information to receive data from a second device in a first timeslot of a first channel, before a start moment of data transmission time corresponding to the first timeslot of the first channel, the first device sends a contention frame to contend for the first timeslot of the first channel ~202

(51) Int. Cl.
*H04W 74/08* (2009.01)
*H04W 84/12* (2009.01)

(56) References Cited

U.S. PATENT DOCUMENTS

| | | |
|---|---|---|
| 2004/0184473 A1 | 9/2004 | Tavli et al. |
| 2007/0263581 A1* | 11/2007 | Benveniste ............ H04W 74/04 370/338 |
| 2009/0238160 A1 | 9/2009 | Bhatti et al. |
| 2010/0157961 A1 | 6/2010 | Ji et al. |
| 2010/0325510 A1* | 12/2010 | Nogami ............... H04B 1/7107 714/750 |
| 2013/0142180 A1 | 6/2013 | Gidlund et al. |
| 2013/0235720 A1* | 9/2013 | Wang ................ H04W 28/0278 370/229 |
| 2013/0235773 A1 | 9/2013 | Wang et al. |
| 2014/0233538 A1* | 8/2014 | Zhang ............... H04W 72/1205 370/336 |
| 2016/0277166 A1 | 9/2016 | Liu |
| 2016/0323776 A1 | 11/2016 | Wu |
| 2016/0330631 A1 | 11/2016 | Wu |
| 2016/0338085 A1 | 11/2016 | Wu |
| 2016/0338105 A1 | 11/2016 | Wu et al. |

FOREIGN PATENT DOCUMENTS

| | | |
|---|---|---|
| CN | 102695265 A | 9/2012 |
| CN | 103026774 A | 4/2013 |

OTHER PUBLICATIONS

"IEEE Standard for Information Technology; Telecommunications and Information Exchange Between Systems Local and Metropolitan Area Networks; Specific Requirements; Part 11: Wireless LAN Medium Access Control (MAC) and Physical Layer (PHY) Specifications; Amendment 4: Enhancements for Very High Throughput for Operation in Bands Below 6 GHz", IEEE Computer Society, IEEE Std 802.11ac-2013, Dec. 11, 2013, pp. 1-425.

* cited by examiner

CHANNEL RESOURCE ALLOCATION METHOD AND COMMUNICATIONS DEVICE

CROSS-REFERENCE TO RELATED APPLICATIONS

This application is a continuation of International Application No. PCT/CN2014/071575, filed on Jan. 27, 2014, which is hereby incorporated by reference in its entirety.

TECHNICAL FIELD

Embodiments relate to the communications field, and more specifically, to a channel resource allocation method and a communications device.

BACKGROUND

A WLAN (Wireless Local Area Network) system works in an unauthorized frequency spectrum. Therefore, there may be another user who shares a frequency spectrum on a channel. If multiple users send data at the same time, mutual interference may occur, causing a conflict. Currently, the WLAN system uses a CSMA/CA (Carrier Sense Multiple Access with Collision Avoidance) mode to avoid a conflict. Carrier sense (CS) means that any device connected to a channel first performs sensing on the channel before the device is ready to send data. Data can be sent only when it is determined that the channel is idle. Multiple access (MA) means that multiple devices may visit a channel at the same time, and a data frame sent by one device may be received by multiple devices. In a CSMA/CA mechanism, a manner of active collision avoidance other than passive detection is used to resolve a conflict problem, which may meet a requirement for a case in which it is not easy to accurately detect whether a conflict occurs. An operation manner of CSMA is that when a device is ready to send a data frame and learns by sensing that a channel is idle, the data frame is sent only when the channel is still idle after another random period of time.

However, efficiency of an operation mode of the CSMA/CA is relatively low. In particular, in a case in which an AP (Access Point) and a STA (Station) are intensively deployed, a collision probability of channel contention greatly increases, and efficiency of MAC (Media Access Control) significantly decreases.

SUMMARY

The present invention provides a channel resource allocation method and a communications device, and provides a method for introducing a scheduling mode into a communications system that uses an unauthorized frequency spectrum.

According to a first aspect, the embodiments provide a channel resource allocation method. The method includes acquiring, by a first device, scheduling information from an access point. The method also includes, if the first device is pre-scheduled by the access point according to the scheduling information to receive data from a second device in a first timeslot of a first channel, before a start moment of data transmission time corresponding to the first timeslot of the first channel, sending, by the first device, a contention frame to contend for the first timeslot of the first channel.

With reference to the first aspect, in a first implementation manner of the first aspect, before the sending, by the first device, a contention frame, the allocation method further includes: performing, by the first device, random backoff or performing random backoff according to a service priority.

With reference to the first aspect and the foregoing implementation manner, in a second implementation manner of the first aspect, if the first device does not receive, from the second device, the data in the first timeslot of the first channel, requesting, by the first device, the access point to perform rescheduling.

According to a second aspect, the embodiments provide a channel resource allocation method. The method includes acquiring, by a second device, scheduling information from an access point. The method also includes receiving, by the second device, at least one contention frame; and if the second device is pre-scheduled by the access point according to the scheduling information to send data to at least one first device in a first timeslot of a first channel, and a sending device of the first contention frame received by the second device belongs to a basic service set BSS in which the access point is located, sending, by the second device, the data to the at least one first device in the first timeslot of the first channel.

With reference to the second aspect, in a first implementation manner of the second aspect, the allocation method further includes: if the sending device of the first contention frame received by the second device does not belong to the BSS in which the access point is located, keeping, by the second device, silent in data transmission time of the first timeslot of the first channel.

With reference to the second aspect and the foregoing implementation manner, in a second implementation manner of the second aspect, the allocation method further includes: requesting, by the second device, the access point to perform rescheduling.

With reference to the second aspect and the foregoing implementation manner, in a third implementation manner of the second aspect, the keeping, by the second device, silent in data transmission time of the first timeslot of the first channel includes: setting, by the second device, a network allocation vector NAV according to the first contention frame, and within time corresponding to the NAV, skipping sending, by the second device, the data on the first channel.

With reference to the second aspect and the foregoing implementation manners, in a fourth implementation manner of the second aspect, the allocation method further includes: determining, by the second device according to an address field of the first contention frame, whether the sending device of the first contention frame belongs to the BSS in which the access point is located.

According to a third aspect, the embodiments provide a channel resource allocation method. The method includes acquiring, by a second device, scheduling information from an access point; receiving, by the second device, at least one contention frame. The method also includes, if the second device is pre-scheduled by the access point according to the scheduling information to send data to at least one first device in a first timeslot of a first channel, and a sending device of each contention frame of the at least one contention frame belongs to a basic service set BSS in which the access point is located, sending, by the second device, the data to the at least one first device in the first timeslot of the first channel.

With reference to the third aspect, in a first implementation manner of the third aspect, the allocation method further includes: if at least one sending device of the sending device that is of each first contention frame of the at least one contention frame does not belong to the BSS in which the access point is located, keeping, by the second device, silent in data transmission time of the first timeslot of the first channel.

With reference to the third aspect and the foregoing implementation manner, in a second implementation manner of the third aspect, the allocation method further includes: requesting, by the second device, the access point to perform rescheduling.

With reference to the third aspect and the foregoing implementation manner, in a third implementation manner of the third aspect, the keeping, by the second device, silent in data transmission time of the first timeslot of the first channel includes: setting, by the second device, a network allocation vector NAV according to the at least one contention frame, and within time corresponding to the NAV, skipping sending, by the second device, the data on the first channel.

With reference to the third aspect and the foregoing implementation manners, in a fourth implementation manner of the third aspect, the allocation method further includes: determining, by the second device according to an address field of each contention frame of the at least one contention frame, whether the sending device of each contention frame belongs to the BSS in which the access point is located.

According to a fourth aspect, the embodiments provide a communications device. The device includes an acquiring unit, configured to acquire scheduling information from an access point. The device also includes a sending unit, configured to: if the communications device is pre-scheduled by the access point according to the scheduling information to receive data from a second device in a first timeslot of a first channel, before a start moment of data transmission time corresponding to the first timeslot of the first channel, send a contention frame to contend for the first timeslot of the first channel.

With reference to the fourth aspect, in a first implementation manner of the fourth aspect, the communications device further includes: a control unit, configured to control the communications device to perform random backoff or perform random backoff according to a service priority.

With reference to the fourth aspect and the foregoing implementation manner, in a second implementation manner of the fourth aspect, if the communications device does not receive, from the second device, the data in the first timeslot of the first channel, the sending unit is further configured to request the access point to perform rescheduling.

According to a fifth aspect, the embodiments provide a communications device. The device includes an acquiring unit, configured to acquire scheduling information from an access point. The device also includes a receiving unit, configured to receive at least one contention frame. The device also includes a sending unit, configured to: if the communications device is pre-scheduled by the access point according to the scheduling information to send data to at least one first device in a first timeslot of a first channel, and a sending device of the first contention frame received by the communications device belongs to a basic service set BSS in which the access point is located, send the data to the at least one first device in the first timeslot of the first channel.

With reference to the fifth aspect, in a first implementation manner of the fifth aspect, the communications device further includes: a control unit, configured to: if the sending device of the first contention frame received by the communications device does not belong to the BSS in which the access point is located, control the communications device to keep silent in data transmission time of the first timeslot of the first channel.

With reference to the fifth aspect and the foregoing implementation manner, in a second implementation manner of the fifth aspect, the sending unit is further configured to request the access point to perform rescheduling.

With reference to the fifth aspect and the foregoing implementation manner, in a third implementation manner of the fifth aspect, the control unit is specifically configured to: set a network allocation vector NAV according to the first contention frame, and within time corresponding to the NAV, control the communications device not to send the data on the first channel.

With reference to the fifth aspect and the foregoing implementation manners, in a fourth implementation manner of the fifth aspect, the communications device further includes: a determining unit, configured to determine, according to an address field of the first contention frame, whether the sending device of the first contention frame belongs to the BSS in which the access point is located.

According to a sixth aspect, the embodiments provide a communications device. The device includes an acquiring unit, configured to acquire scheduling information from an access point. The device also includes a receiving unit, configured to receive at least one contention frame. The device also includes a sending unit, configured to: if the communications device is pre-scheduled by the access point according to the scheduling information to send data to at least one first device in a first timeslot of a first channel, and a sending device of each contention frame of the at least one contention frame belongs to a basic service set BSS in which the access point is located, send the data to the at least one first device in the first timeslot of the first channel.

With reference to the sixth aspect, in a first implementation manner of the sixth aspect, the communications device further includes: a control unit, configured to: if at least one sending device of the sending device that is of each contention frame of the at least one contention frame does not belong to the BSS in which the access point is located, control the communications device to keep silent in data transmission time of the first timeslot of the first channel.

With reference to the sixth aspect and the foregoing implementation manner, in a second implementation manner of the sixth aspect, the sending unit is further configured to request the access point to perform rescheduling.

With reference to the sixth aspect and the foregoing implementation manner, in a third implementation manner of the sixth aspect, the control unit is specifically configured to: set a network allocation vector NAV according to the at least one contention frame, and within time corresponding to the NAV, control the communications device not to send the data on the first channel.

With reference to the sixth aspect and the foregoing implementation manners, in a fourth implementation manner of the sixth aspect, the communications device further includes: a determining unit, configured to determine, according to an address field of each contention frame of the at least one contention frame, whether the sending device of each contention frame belongs to the BSS in which the access point is located.

Based on the foregoing technical solutions, in the embodiments of the present invention, a scheduling mode and a contention mode are combined, an access point may first perform pre-scheduling on a first device, and before a start moment at which data transmission is performed in a corresponding timeslot, the first device sends a contention frame according to scheduling information to contend for a use right of the channel, which reduces a quantity of potential contention devices and improves efficiency. The embodiments of the present invention provides a method for introducing a scheduling mode into a communications system that uses an unauthorized frequency spectrum.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to a communications system that uses an unauthorized frequency spectrum resource, for example, a WLAN system.

It should further be understood that in the embodiments, an access point is a network device providing an access service, for example, an AP in the WLAN system. A station is a device, at another end, accessing the access point by using a wireless network to perform communication. For example, user equipment ("UE" for short) may be referred to as a terminal, a mobile station ("MS" for short), a mobile terminal, or the like, which is not limited in the present invention. However, for ease of description, the following embodiments use the access point (AP) and the station (STA) as an example for description.

Figure 1:
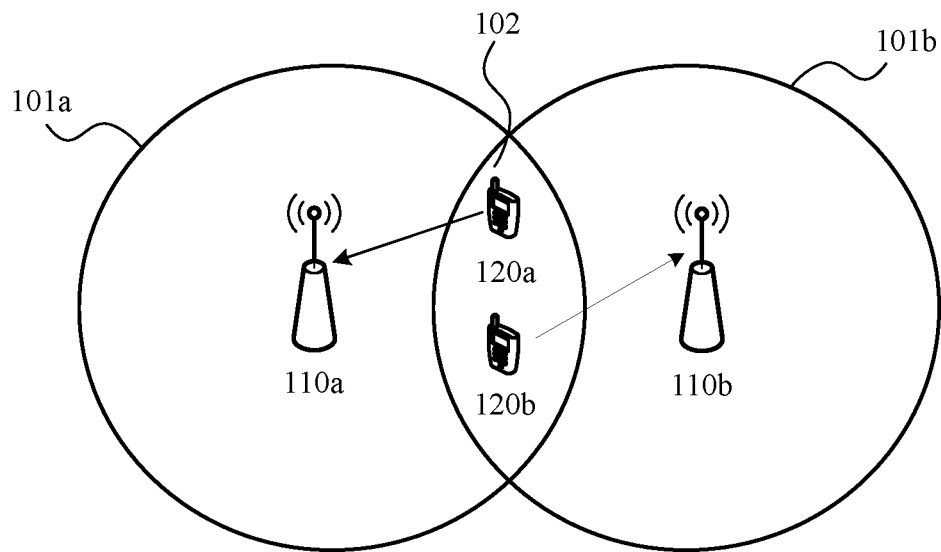
FIG. 1 is a schematic structural diagram of an applicable communications system according to an embodiment.

FIG. 1 is a schematic structural diagram of an applicable communications system according to an embodiment. The communications system in FIG. 1 is described by using a first AP 110a whose coverage area is 101a and a second AP 110b whose coverage area is 101b as an example. However, this embodiment sets no limitation on a quantity of APs 110.

A first STA 120a accesses the first AP 110a, a second STA 120b accesses the second AP 110b, and the first STA 120a and the second STA 120b are located in an overlapped coverage area 102 of 101a and 101b. Similarly, this embodiment of the present invention sets no limitation on a quantity of STAs.

For example, in a CSMA/CA mode, the RTS/CTS (Request to Send/Clear to Send) protocol is used for transmission protection, and the station or the access point first reserves a channel before sending data. The first AP 110a first sends an RTS frame before sending the data, and the first STA 120a responds with a CTS frame after receiving the RTS frame. All other APs (for example, the second AP 110b) or STAs (for example, the second STA 120b) that receive the RTS frame or the CTS frame set a NAV (Network Allocation Vector) according to an indication in the received RTS frame or CTS frame. Within time corresponding to the NAV, these APs or STAs cannot send data on a corresponding channel. After sending the RTS frame and receiving the CTS frame with which the first STA 120a responds, the first AP 110a obtains a sending opportunity. Within this period of time, the first AP 110a sends the data to the first STA 120a, without interference from a surrounding AP or STA.

However, when the AP and the STA in the WLAN system are intensively deployed, a collision probability of the RTS frame greatly increases, and after collision occurs, a length of a contention window doubles and MAC efficiency is significantly reduced. When a system overhead is relatively high, system efficiency is also reduced.

For another example, in the communications system into which a scheduling mode is introduced, both the first AP 110a and the second AP 110b work in the scheduling mode and cannot cooperate with each other. It is assumed that a scheduled transmission resource is a first channel when the first AP 110a communicates with the first STA 121a, and a scheduled transmission resource is a second channel when the second AP 110b communicates with the second STA 120b. When a frequency of the first channel is the same as or similar to that of the second channel, strong mutual interference is formed, and frequent communication errors appear in both the first AP 110a and the second AP 111b. Therefore, neither the first AP 110a nor the second AP 111b can normally work.

This embodiment provides a method for introducing a scheduling mode into a communications system that uses an unauthorized frequency spectrum, so that relatively high MAC efficiency is achieved, and interference to data transmission of a non-cooperative scheduling AP is reduced.

Figure 2:
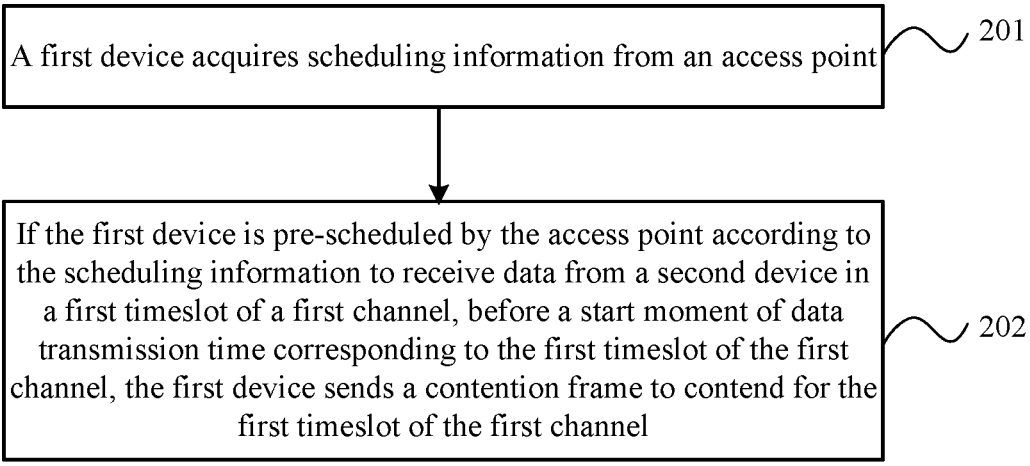
FIG. 2 is a schematic flowchart of a channel resource allocation method according to an embodiment.

FIG. 2 is a schematic flowchart of a channel resource allocation method according to an embodiment. The method 20 may be executed by a receiving party in a data transmission process, for example, the AP 110 or the STA 120 shown in FIG. 1.

201. A first device acquires scheduling information from an access point.

For example, the first device may be the access point itself, and in this case, a second device may be a STA; or the first device is a STA, and a second device is the access point itself.

202. If the first device is pre-scheduled by the access point according to the scheduling information to receive data from a second device in a first timeslot of a first channel, before a start moment of data transmission time corresponding to the first timeslot of the first channel, the first device sends a contention frame to contend for the first timeslot of the first channel.

In the channel resource allocation method in this embodiment, a scheduling mode and a contention mode are combined, an access point may first perform pre-scheduling on a first device, and before a start moment at which data transmission is performed in a corresponding timeslot, the first device sends a contention frame according to scheduling information to contend for a use right of the channel, which reduces a quantity of potential contention devices and improves efficiency. This embodiment provides a method for introducing a scheduling mode into a communications system that uses an unauthorized frequency spectrum, achieving relatively high MAC efficiency.

In addition, the first device (a data receiving party) sends the contention frame, and the second device does not need to send a response frame, thereby reducing a signaling overhead of a system.

Further, the scheduling mode is used at each access point AP. However, in a scenario in which cooperative scheduling cannot be performed between APs, according to the method in this embodiment, some periods of time may be divided from some timeslots or each timeslot of a channel to perform contention. The scheduling information takes effect only when the contention succeeds. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that if the first device succeeds in contending, the second device obtains a sending opportunity and sends, according to the scheduling information, data to the first device in a first timeslot of a first channel. In this case, the scheduling information takes effect. Contrarily, if the first device fails to contend, the second device loses the sending opportunity this time. In this case, the scheduling information is invalid.

It should further be understood that in a WLAN network, the first device may be an AP or a STA. Correspondingly, when the first device acquires the scheduling information from the access point, the AP may acquire local scheduling information, or the STA may receive the scheduling information from the AP.

It should further be understood that a moment at which the first device sends the contention frame is prior to a start moment of data transmission corresponding to the first timeslot of the first channel. In this way, the scheduling information takes effect only when the channel contention succeeds. For example, when the first timeslot is divided into two parts, that is, one part used for data transmission and the other part used for channel contention, contention needs to be completed before the start moment of the data transmission in the first timeslot.

Optionally, as an embodiment, before the first device sends the contention frame, the first device may further perform random backoff or perform random backoff according to a service priority.

In this way, contention efficiency may be improved, and in particular, when the random backoff is performed according to the service priority, it is more helpful for a device with a higher service priority to succeed in contending.

Optionally, as another embodiment, if the first device does not receive the data in the first timeslot of the first channel, the first device requests the access point to perform rescheduling. In this case, if the first device does not receive, from the second device, the data in the first timeslot of the first channel, it indicates that the first device fails to contend for the channel this time and requests the access point to perform rescheduling.

For example, if the first device does not receive, from the second device, the data in the first timeslot of the first channel, the first device sends a feedback message or a request message to the access point, so as to request the access point to perform rescheduling. After receiving the feedback message or the request message, the access point reallocates a channel resource to the first device and delivers scheduling information. After receiving new scheduling information, the first device contends for the channel again in corresponding time according to the new scheduling information.

Figure 3:
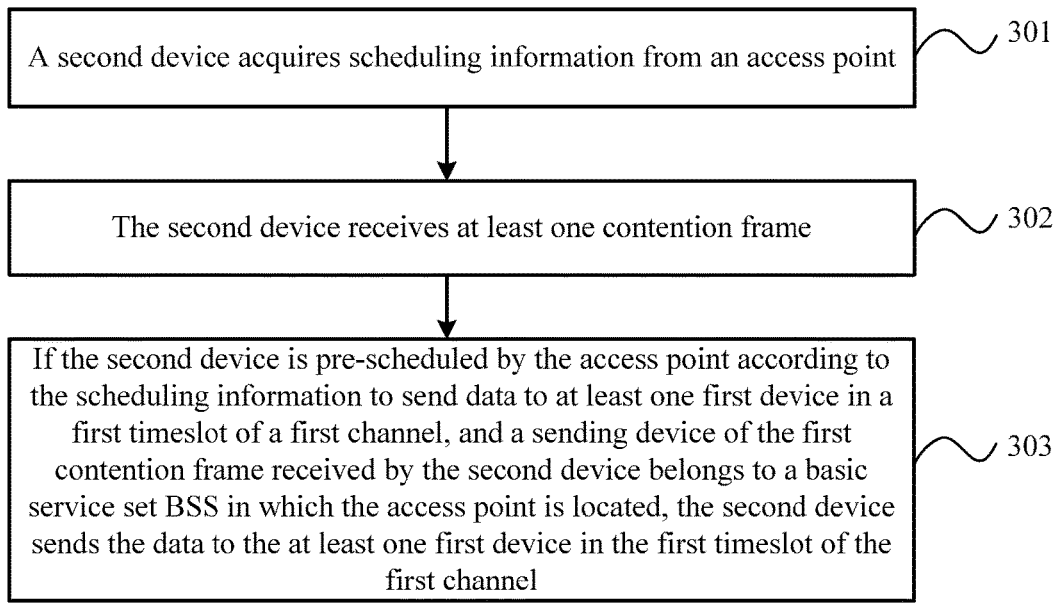
FIG. 3 is a schematic flowchart of a channel resource allocation method according to another embodiment.

FIG. 3 is a schematic flowchart of a channel resource allocation method according to another embodiment. The method 30 may be executed by a receiving party in a data transmission process, for example, the AP 110 or the STA 120 shown in FIG. 1.

301. A second device acquires scheduling information from an access point.

For example, the second device may be the access point itself, and in this case, a first device may be a STA, or a first device is a STA, and the second device is the access point itself.

302. The second device receives at least one contention frame.

303. If the second device is pre-scheduled by the access point according to the scheduling information to send data to at least one first device in a first timeslot of a first channel, and a sending device of the first contention frame received by the second device belongs to a basic service set BSS in which the access point is located, the second device sends the data to the at least one first device in the first timeslot of the first channel.

In the channel resource allocation method in this embodiment, a scheduling mode and a contention mode are combined, and an access point may first perform pre-scheduling on a second device. When a sending device of the first contention frame received by the second device belongs to a BSS in which a same access point is located, the second device sends data in a first timeslot of a first channel. This embodiment provides a method for introducing a scheduling mode into a communications system that uses an unauthorized frequency spectrum, achieving relatively high MAC efficiency.

In addition, a first device (a data receiving party) sends a contention frame, and the second device does not need to send a response frame, thereby reducing a signaling overhead of a system.

Further, the scheduling mode is used at each access point AP. However, in a scenario in which cooperative scheduling cannot be performed between APs, according to the method in this embodiment, some periods of time may be divided from some timeslots or each timeslot of a channel to perform contention. The scheduling information takes effect only when the contention succeeds, that is, when the sending device of the first contention frame received by the second device belongs to the BSS in which the same access point is located. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that when the sending device of the first contention frame received by the second device belongs to the BSS in which the same access point is located, it indicates that the first device succeeds in contending, and the second device obtains a sending opportunity and sends, according to the scheduling information, the data to the first device in the first timeslot of the first channel. In this case, the scheduling information takes effect. Contrarily, the second device loses the sending opportunity this time. In this case, the scheduling information is invalid.

It should further be understood that in a WLAN network, the second device may be an AP or a STA. Correspondingly, when the second device acquires the scheduling information from the access point, the AP may acquire local scheduling information, or the STA may receive the scheduling information from the AP.

It should further be understood that, that the sending device of the first contention frame belongs to the BSS in which the access point is located means that the access point is a service access point of the sending device. For example, the sending device is associated with the access point.

Optionally, as an embodiment, if the sending device of the first contention frame received by the second device does not belong to the BSS in which the access point is located, the second device keeps silent in data transmission time of the first timeslot of the first channel.

In this way, when the contention fails, that is, when the sending device of the first contention frame received by the second device does not belong to the BSS in which the access point is located, the second device keeps silent in the first timeslot of the first channel and does not cause interference to another device that succeeds in contending. It should be understood that in this embodiment of the present invention, when the contention fails, data transmission of the second device on another channel is not affected.

Optionally, as another embodiment, if the sending device of the first contention frame received by the second device does not belong to the BSS in which the access point is located, the second device requests the access point to perform rescheduling.

For example, if the sending device of the first contention frame received by the second device does not belong to the BSS in which the access point is located, the second device sends a feedback message or a request message to the access point, so as to request the access point to perform rescheduling. After receiving the feedback message or the request message, the access point reallocates a channel resource to the second device and delivers scheduling information.

Optionally, as another embodiment, when the second device keeps silent in the data transmission time of the first timeslot of the first channel, the second device sets a network allocation vector NAV according to the first contention frame, and within time corresponding to the NAV, the second device does not send the data on the first channel.

Optionally, as another embodiment, the second device determines, according to an address field of the first contention frame, whether the sending device of the first contention frame belongs to the BSS in which the access point is located.

For example, the second device detects the address field of the first contention frame, and if the address field is the same as a MAC address of an AP associated with the second device, it is considered that the sending device of the first contention frame belongs to the BSS in which the access point is located; otherwise, the sending device of the first contention frame does not belong to the BSS in which the access point is located.

Figure 4:
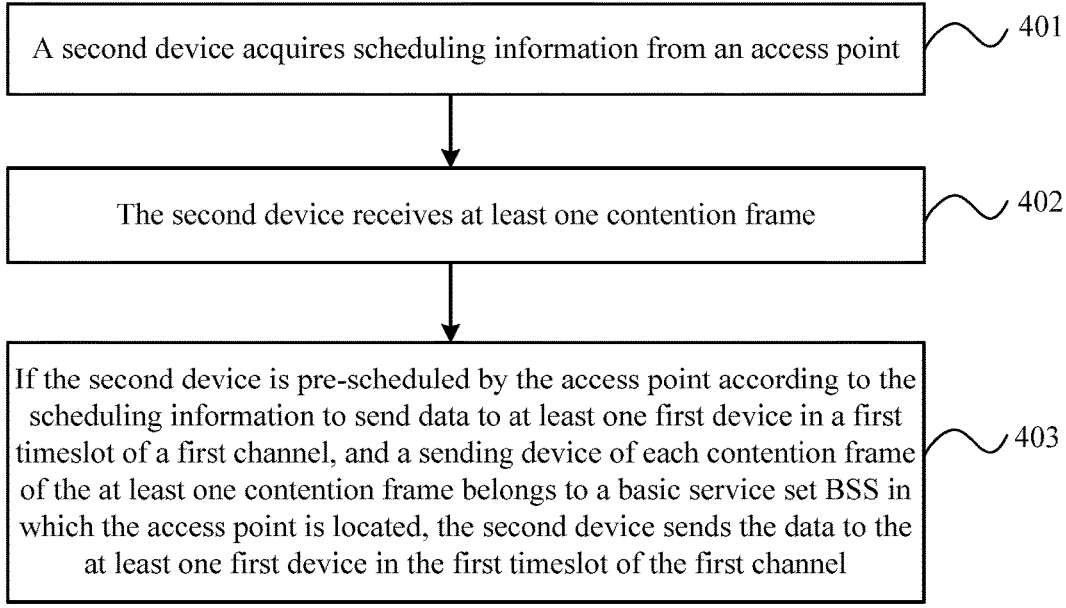
FIG. 4 is a schematic flowchart of a channel resource allocation method according to another embodiment.

FIG. 4 is a schematic flowchart of a channel resource allocation method according to another embodiment. The method 40 may be executed by a receiving party in a data transmission process, for example, the AP 110 or the STA 120 shown in FIG. 1.

401. A second device acquires scheduling information from an access point.

For example, the second device may be the access point itself and in this case, a first device may be a STA, or a first device is a STA, and the second device is the access point itself.

402. The second device receives at least one contention frame.

403. If the second device is pre-scheduled by the access point according to the scheduling information to send data to at least one first device in a first timeslot of a first channel, and a sending device of each contention frame of the at least one contention frame belongs to a basic service set BSS in which the access point is located, the second device sends the data to the at least one first device in the first timeslot of the first channel.

In the channel resource allocation method in this embodiment, a scheduling mode and a contention mode are combined, and an access point may first perform pre-scheduling on a second device. When a sending device of a contention frame received by the second device belongs to a BSS in which an access point associated with the second device is located, the second device sends data in a first timeslot of a first channel. This embodiment provides a method for introducing a scheduling mode into a communications system that uses an unauthorized frequency spectrum, achieving relatively high MAC efficiency.

In addition, a first device (a data receiving party) sends a contention frame, and the second device does not need to send a response frame, thereby reducing a signaling overhead of a system.

Further, the scheduling mode is used at each access point AP. However, in a scenario in which cooperative scheduling cannot be performed between APs, according to the method in this embodiment, some periods of time may be divided from some timeslots or each timeslot of a channel to perform contention. The scheduling information takes effect only when the contention succeeds, that is, when a sending device of a contention frame received by the second device belongs to a BSS in which an access point associated with the second device is located. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that when a sending device of each contention frame of at least one contention frame received by the second device belongs to a BSS in which a same access point is located, it indicates that the first device succeeds in contending, and the second device obtains a sending opportunity and sends, according to the scheduling information, the data to the first device in the first timeslot of the first channel. In this case, the scheduling information takes effect. Contrarily, the second device loses the sending opportunity this time. In this case, the scheduling information is invalid.

It should further be understood that in a WLAN network, the second device may be an AP or a STA. Correspondingly, when the second device acquires the scheduling information from the access point, the AP may acquire local scheduling information, or the STA may receive the scheduling information from the AP.

It should further be understood that, that the sending device of the contention frame belongs to the BSS in which the access point is located means that the access point is a service access point of the sending device. For example, the sending device is associated with the access point.

Optionally, as an embodiment, if at least one sending device of the sending device that is of each contention frame of the at least one contention frame does not belong to the BSS in which the access point is located, the second device keeps silent in data transmission time of the first timeslot of the first channel.

In this way, when the contention fails, that is, when the at least one of the sending device that is of the contention frame received by the second device does not belong to the BSS in which the access point is located, the second device keeps silent in the first timeslot of the first channel and does not cause interference to another device that succeeds in contending. It should be understood that in this embodiment of the present invention, when the contention fails, data transmission of the second device on another channel is not affected.

Optionally, as another embodiment, if at least one sending device of the sending device that is of each contention frame of the at least one contention frame does not belong to the BSS in which the access point is located, the second device requests the access point to perform rescheduling.

For example, if the sending device of the first contention frame received by the second device does not belong to the BSS in which the access point is located, the second device sends a feedback message or a request message to the access point, so as to request the access point to perform rescheduling. After receiving the feedback message or the request message, the access point reallocates a channel resource to the second device and delivers scheduling information.

Optionally, as another embodiment, when the second device keeps silent in the data transmission time of the first timeslot of the first channel, the second device sets a network allocation vector NAV according to the at least one contention frame, and within time corresponding to the NAV, the second device does not send the data on the first channel.

Optionally, as another embodiment, the second device determines, according to an address field of each contention frame of the at least one contention frame, whether the sending device of each contention frame belongs to the BSS in which the access point is located.

For example, the second device detects an address field of a received contention frame, and if the address field is the same as a MAC address of an AP associated with the second device, it is considered that the sending device of the contention frame belongs to the BSS in which the access point is located; otherwise, the sending device of the contention frame does not belong to the BSS in which the access point is located.

The following provides a detailed description of embodiments of the present invention with reference to specific examples. It should be noted that these examples are merely intended to help a person skilled in the art better understand the embodiments, but are not intended to limit the scope of the embodiments.

Figure 5:
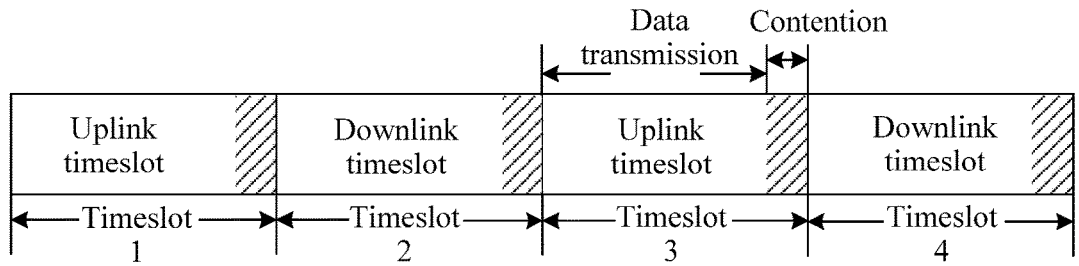
FIG. 5 is a schematic diagram of channel resource division according to an embodiment.

FIG. 5 is a schematic diagram of channel resource division according to an embodiment.

As shown in FIG. 5, each timeslot of a channel resource is divided into two parts, where one part is used for data transmission, the other part is used for channel contention, and an uplink timeslot and a downlink timeslot that are of data transmission time alternately appear. Each AP using the channel resource pre-schedules a communications device to perform data transmission, and uplink and downlink synchronization is achieved at each AP.

A timeslot 3 is used as an example for description herein. An AP delivers scheduling information to a STA within data transmission time (a downlink timeslot) of a timeslot 2, the AP is used as a device that is pre-scheduled to the timeslot 3 to receive data, and sends, according to the scheduling information, a contention frame within contention time of the timeslot 2 to contend for the timeslot 3. Before sending the contention frame, the AP may first perform random backoff. In addition, within the downlink timeslot of the timeslot 2, the AP may simultaneously deliver scheduling information of a timeslot 4.

A STA that is pre-scheduled to the timeslot 3 to send the data may receive multiple contention frames. In this case, the STA may detect an address field of the first received contention frame, and if the address field is the same as a MAC address of an AP associated with the STA, the STA sends the data within data transmission time of the timeslot 3. Otherwise, the STA keeps silent within the data transmission time of the timeslot 3. A STA that is pre-scheduled to the timeslot 4 to receive data needs to broadcast a contention frame within contention time of the timeslot 3 to contend for the timeslot 4. In this case, an uplink-downlink switching gap needs to be inserted between the data transmission time (the downlink timeslot) and the contention time that are of the timeslot 2.

Figure 6:
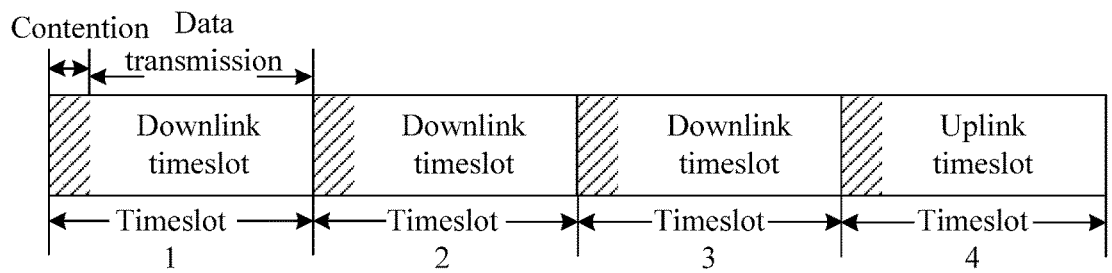
FIG. 6 is a schematic diagram of channel resource division according to another embodiment.

FIG. 6 is a schematic diagram of channel resource division according to another embodiment.

As shown in FIG. 6, an uplink timeslot and a downlink timeslot that are of a channel resource do not alternately appear. Each timeslot is further divided into two parts, where one part is used for data transmission, and the other part is used for channel contention. Each AP using the channel resource pre-schedules a communications device to perform data transmission, and uplink and downlink synchronization is achieved at each AP.

A timeslot 1 is used as an example for description herein. It is assumed that scheduling information of the timeslot 1, a timeslot 2, and a timeslot 3 is delivered at a head of the timeslot 1 or at a tail of a previous timeslot. In this case, when a timeslot is divided, contention time is placed prior to data transmission time, and a STA that is pre-scheduled to the timeslot 1 to receive data sends a contention frame within contention time of the timeslot 1. Similarly, before sending the contention frame, the STA may perform random backoff.

An AP that is pre-scheduled to the timeslot 1 to send the data may receive multiple contention frames. In this case, the AP may detect an address field of the first received contention frame, and if the address field is the same as a MAC address of the AP, the AP sends the data in the timeslot 1 (In this case, the AP may send, according to scheduling information, the data to all STAs scheduled to the channel, but is not limited to sending the data to a sending device of the contention frame). Otherwise, the AP keeps silent within the data transmission time of the timeslot 1.

It should be understood that channel resource division manners shown in FIG. 5 and FIG. 6 are merely two implementation manners in the embodiments. Another channel resource division manner that may be predicted and can implement the method in the embodiments of the present invention should fall into a protection scope of the embodiments.

Figure 7:
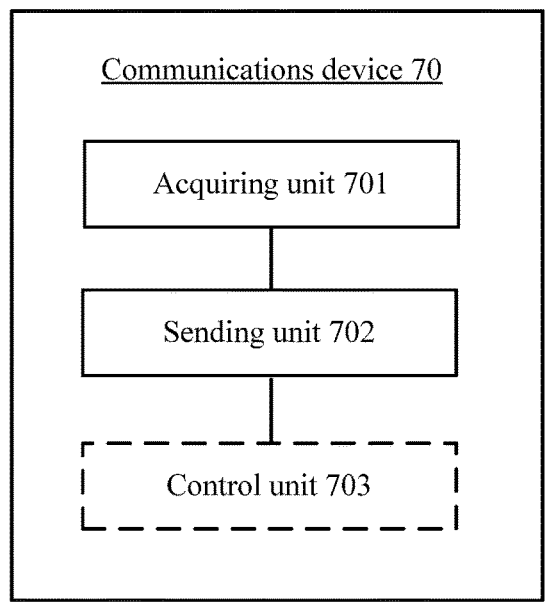
FIG. 7 is a schematic block diagram of a communications device according to an embodiment.

FIG. 7 is a schematic block diagram of a communications device according to an embodiment. A communications device 70 in FIG. 7 includes an acquiring unit 701 and a sending unit 702. For example, the communications device 70 may be the AP 110 or the STA 120 shown in FIG. 1.

The acquiring unit 701 is configured to acquire scheduling information from an access point.

The sending unit 702 is configured to: if the communications device is pre-scheduled by the access point according to the scheduling information to receive data from a second device in a first timeslot of a first channel, and before a start moment of data transmission time corresponding to the first timeslot of the first channel, send a contention frame to contend for the first timeslot of the first channel.

In this embodiment of the present invention, a scheduling mode and a contention mode are combined, an access point may first perform pre-scheduling on a communications device, and before a start moment at which data transmission is performed in a corresponding timeslot, the communications device sends a contention frame according to scheduling information to contend for a use right of the channel, which reduces a quantity of potential contention devices and improves efficiency. This embodiment provides a method for introducing a scheduling mode into a communications system that uses an unauthorized frequency spectrum, achieving relatively high MAC efficiency.

In addition, a first device (a data receiving party) sends the contention frame, and the second device does not need to send a response frame, thereby reducing a signaling overhead of a system.

Further, the scheduling mode is used at each access point AP. However, in a scenario in which cooperative scheduling cannot be performed between APs, according to this embodiment, some periods of time may be divided from some timeslots or each timeslot of a channel to perform contention. The scheduling information takes effect only when the contention succeeds. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that if the first device succeeds in contending, the second device obtains a sending opportunity and sends, according to the scheduling information, data to the first device in a first timeslot of a first channel. In this case, the scheduling information takes effect. Contrarily, if the first device fails to contend, the second device loses the sending opportunity this time. In this case, the scheduling information is invalid.

It should further be understood that in a WLAN network, the communications device may be an AP or a STA. Correspondingly, when the communications device acquires the scheduling information from the access point, the AP may acquire local scheduling information, or the STA may receive the scheduling information from the AP.

It should further be understood that a moment at which the communications device sends the contention frame is prior to a start moment of data transmission corresponding to the first timeslot of the first channel. In this way, the scheduling information takes effect only when the channel contention succeeds. For example, when the first timeslot is divided into two parts, that is, one part used for data transmission and the other part used for channel contention, contention needs to be completed before the start moment of the data transmission in the first timeslot.

Optionally, as an embodiment, the communications device 70 further includes: a control unit 703, configured to control the communications device to perform random backoff or perform random backoff according to a service priority.

In this way, contention efficiency may be improved, and in particular, when the random backoff is performed according to the service priority, it is more helpful for a device with a higher service priority to succeed in contending.

Optionally, as another embodiment, if the communications device does not receive, from the second device, the data in the timeslot of the first channel, the sending unit 702 is further configured to request the access point to perform rescheduling. In this case, if the communications device does not receive the data in the timeslot of the first channel, it indicates that the communications device fails to contend for the channel this time and requests the access point to perform rescheduling.

Figure 8:
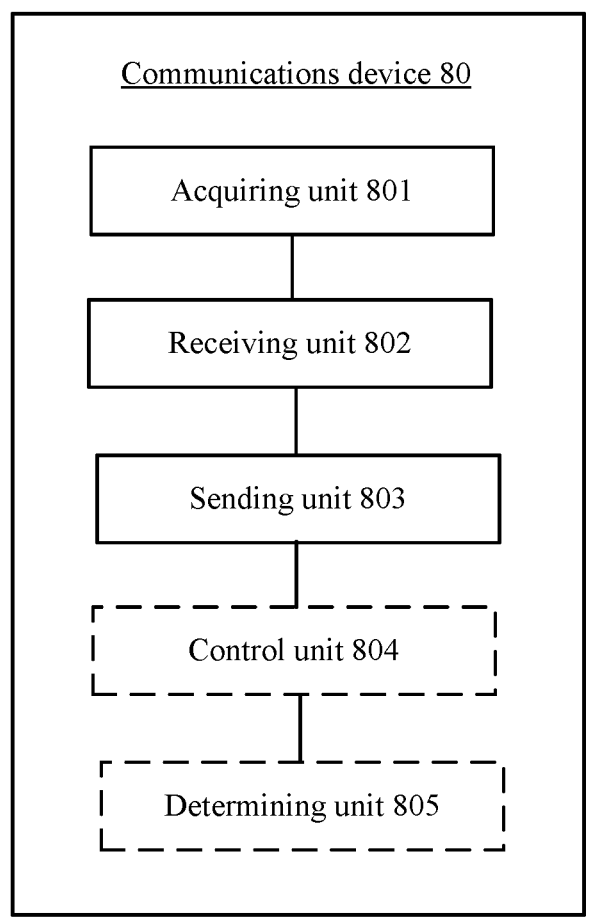
FIG. 8 is a schematic block diagram of a communications device according to another embodiment.

FIG. 8 is a schematic block diagram of a communications device according to another embodiment. A communications device 80 in FIG. 8 includes an acquiring unit 801, a receiving unit 802, and a sending unit 803. For example, the communications device 80 may be the AP 110 or the STA 120 shown in FIG. 1.

The acquiring unit 801 is configured to acquire scheduling information from an access point.

The receiving unit 802 is configured to receive at least one contention frame.

The sending unit 803 is configured to: if the communications device is pre-scheduled by the access point according to the scheduling information to send data to at least one first device in a first timeslot of a first channel, and a sending device of the first contention frame received by the communications device belongs to a basic service set BSS in which the access point is located, send the data to the at least one first device in the first timeslot of the first channel.

In this embodiment, a scheduling mode and a contention mode are combined, and an access point may first perform pre-scheduling on a communications device. When a sending device of the first contention frame received by the communications device belongs to a BSS in which a same access point is located, the communications device sends data in a first timeslot of a first channel. This embodiment of the present invention provides a method for introducing a scheduling mode into a communications system that uses an unauthorized frequency spectrum, achieving relatively high MAC efficiency.

In addition, a first device (a data receiving party) sends a contention frame, and a second device does not need to send a response frame, thereby reducing a signaling overhead of a system.

Further, the scheduling mode is used at each access point AP. However, in a scenario in which cooperative scheduling cannot be performed between APs, according to this embodiment of the present invention, some periods of time may be divided from some timeslots or each timeslot of a channel to perform contention. The scheduling information takes effect only when the contention succeeds, that is, when the sending device of the first contention frame received by the communications device belongs to the BSS in which the same access point is located. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that when a sending device of the first contention frame received by the second device belongs to the BSS in which the same access point is located, it indicates that the first device succeeds in contending, and the second device obtains a sending opportunity and sends, according to the scheduling information, the data to the first device in the first timeslot of the first channel. In this case, the scheduling information takes effect. Contrarily, the second device loses the sending opportunity this time. In this case, the scheduling information is invalid.

It should further be understood that in a WLAN network, the communications device may be an AP or a STA. Correspondingly, when the communications device acquires the scheduling information from the access point, the AP may acquire local scheduling information, or the STA may receive the scheduling information from the AP.

It should further be understood that, that the sending device of the first contention frame belongs to the BSS in which the access point is located means that the access point is a service access point of the sending device. For example, the sending device is associated with the access point.

Optionally, as an embodiment, the communications device 80 further includes: a control unit 804, configured to: if the sending device of the first contention frame received by the communications device does not belong to the BSS in which the access point is located, control the communications device to keep silent in data transmission time of the first timeslot of the first channel.

In this way, when the contention fails, that is, when the sending device of the first contention frame received by the communications device does not belong to the BSS in which the access point is located, the communications device keeps silent in the first timeslot of the first channel and does not cause interference to another device that succeeds in contending. It should be understood that in this embodiment of the present invention, when the contention fails, data transmission of the second device on another channel is not affected.

Optionally, as another embodiment, if the sending device of the first contention frame received by the communications device does not belong to the BSS in which the access point is located, the sending unit 803 is further configured to request the access point to perform rescheduling.

Optionally, as another embodiment, the control unit 804 is specifically configured to: set a network allocation vector NAV according to the first contention frame, and within time corresponding to the NAV, control the communications device not to send the data on the first channel.

Optionally, as another embodiment, the communications device 80 further includes: a determining unit 805, configured to determine, according to an address field of the first contention frame, whether the sending device of the first contention frame belongs to the BSS in which the access point is located.

Figure 9:
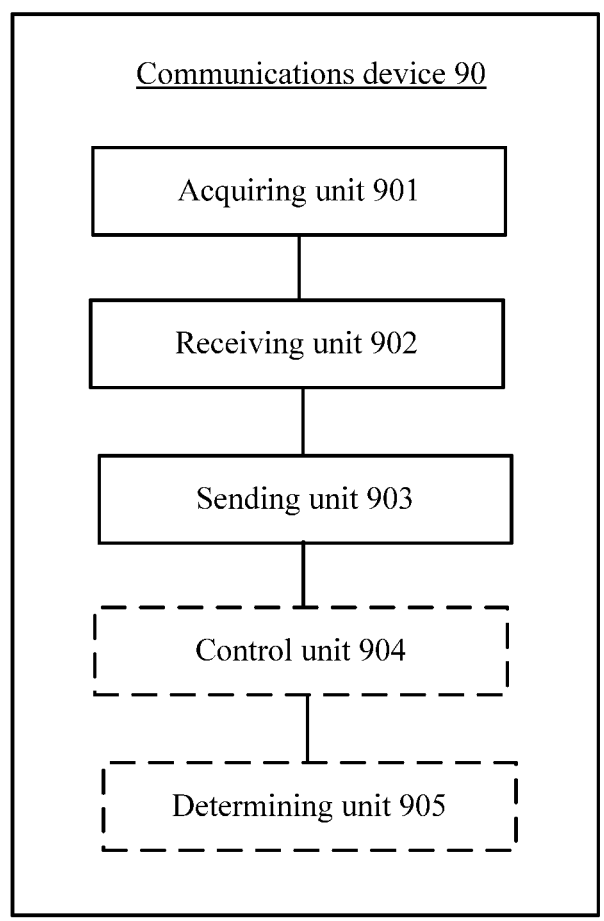
FIG. 9 is a schematic block diagram of a communications device according to another embodiment.

FIG. 9 is a schematic block diagram of a communications device according to another embodiment. A communications device 90 in FIG. 9 includes an acquiring unit 901, a receiving unit 902, and a sending unit 903. For example, the communications device 90 may be the AP 110 or the STA 120 shown in FIG. 1.

The acquiring unit 901 is configured to acquire scheduling information from an access point.

The receiving unit 902 is configured to receive at least one contention frame.

The sending unit 903 is configured to: if the communications device is pre-scheduled by the access point according to the scheduling information to send data to at least one first device in a first timeslot of a first channel, and a sending device of each contention frame of the at least one contention frame belongs to a basic service set BSS in which the access point is located, send the data to the at least one first device in the first timeslot of the first channel.

In this embodiment, a scheduling mode and a contention mode are combined, and an access point may first perform pre-scheduling on a communications device. When a sending device of a contention frame received by the communications device belongs to a BSS in which an access point associated with the communications device is located, the communications device sends data in a first timeslot of a first channel. This embodiment provides a method for introducing a scheduling mode into a communications system that uses an unauthorized frequency spectrum, achieving relatively high MAC efficiency.

In addition, a first device (a data receiving party) sends a contention frame, and a second device does not need to send a response frame, thereby reducing a signaling overhead of a system.

Further, the scheduling mode is used at each access point AP. However, in a scenario in which cooperative scheduling cannot be performed between APs, according to this embodiment, some periods of time may be divided from some timeslots or each timeslot of a channel to perform contention. The scheduling information takes effect only when the contention succeeds, that is, when a sending device of a contention frame received by the communications device belongs to a BSS in which an access point associated with the communications device is located. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that when a sending device of each contention frame of at least one contention frame received by the second device belongs to a BSS in which a same access point is located, it indicates that the first device succeeds in contending, and the second device obtains a sending opportunity and sends, according to the scheduling information, the data to the first device in the first timeslot of the first channel. In this case, the scheduling information takes effect. Contrarily, the second device loses the sending opportunity this time. In this case, the scheduling information is invalid.

It should further be understood that in a WLAN network, the communications device may be an AP or a STA. Correspondingly, when the communications device acquires the scheduling information from the access point, the AP may acquire local scheduling information, or the STA may receive the scheduling information from the AP.

It should further be understood that, that the sending device of the contention frame belongs to the BSS in which the access point is located means that the access point is a service access point of the sending device. For example, the sending device is associated with the access point.

Optionally, as an embodiment, the communications device 90 further includes: a control unit 904, configured to: if at least one sending device of the sending device that is of each contention frame of the at least one contention frame does not belong to the BSS in which the access point is located, control the communications device to keep silent in data transmission time of the first timeslot of the first channel.

In this way, when the contention fails, that is, when the at least one of the sending device that is of the contention frame received by the second device does not belong to the BSS in which the access point is located, the second device keeps silent in the first timeslot of the first channel and does not cause interference to another device that succeeds in contending. It should be understood that in this embodiment of the present invention, when the contention fails, data transmission of the second device on another channel is not affected.

Optionally, as another embodiment, if the at least one sending device of the sending device that is of each contention frame of the at least one contention frame does not belong to the BSS in which the access point is located, the sending unit 903 is further configured to request the access point to perform rescheduling.

Optionally, as another embodiment, the control unit 904 is specifically configured to: set a network allocation vector NAV according to the at least one contention frame, and within time corresponding to the NAV, control the communications device not to send the data on the first channel.

Optionally, as another embodiment, the communications device 90 further includes: a determining unit 905, configured to determine, according to an address field of each contention frame of the at least one contention frame, whether the sending device of each contention frame belongs to the BSS in which the access point is located.

Figure 10:
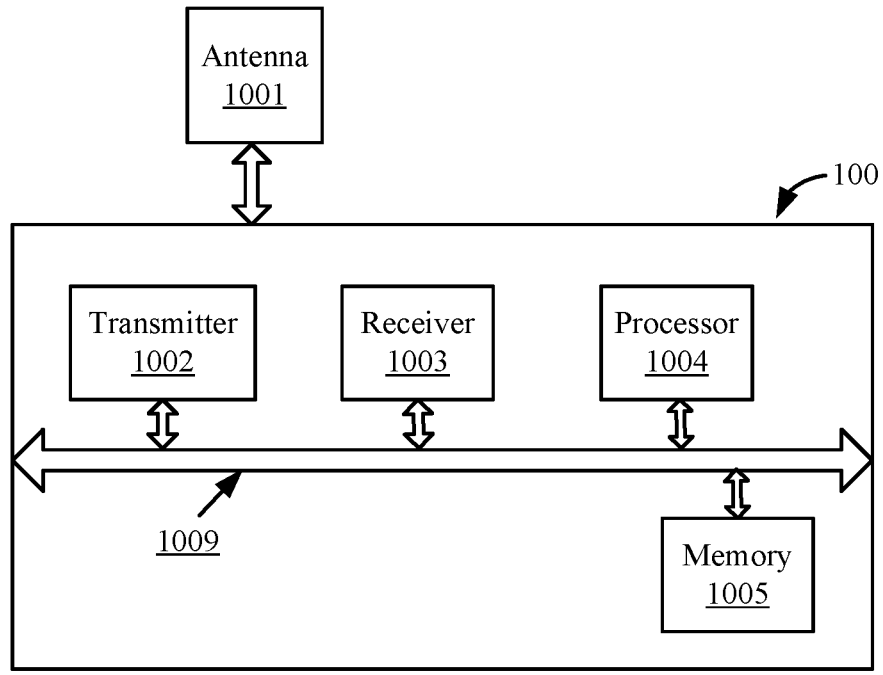
FIG. 10 is a schematic block diagram of a communications device according to another embodiment.

FIG. 10 is a schematic block diagram of a communications device according to another embodiment.

A communications device 100 in FIG. 10 may be configured to implement steps and methods in the foregoing method embodiments. In the embodiment of FIG. 10, the communications device 100 includes an antenna tool, a transmitter 1002, a receiver 1003, a processor 1004, and a memory 1005. The processor 1004 controls an operation of the communications device 100, and may be configured to process a signal. The memory 1005 may include a read-only memory and a random access memory, and provide an instruction and data to the processor 1004. The transmitter 1002 and the receiver 1003 may be coupled to the antenna 1000. All components of the communications device 100 are coupled together by using a bus system 1009, where the bus system 1009 may further include a power bus, a control bus, and a status signal bus in addition to a data bus. However, for clarity of description, various buses are all marked as the bus system 1009 in the figure. For example, the communications device 100 may be the AP 110 or the STA 120 shown in FIG. 1.

Specifically, the memory 1005 may store an instruction for executing the following processes: acquiring, by the processor 1004, scheduling information from an access point; and if the receiver 1003 is pre-scheduled by the access point according to the scheduling information to receive data from a second device in a first timeslot of a first channel, and before a start moment of data transmission time corresponding to the first timeslot of the first channel, sending, by the transmitter 1002, a contention frame to contend for the first timeslot of the first channel.

In this embodiment, a scheduling mode and a contention mode are combined, an access point may first perform pre-scheduling on a communications device, and before a start moment at which data transmission is performed in a corresponding timeslot, the communications device sends a contention frame according to scheduling information to contend for a use right of the channel, which reduces a quantity of potential contention devices and improves efficiency. This embodiment of the present invention provides a method for introducing a scheduling mode into a communications system that uses an unauthorized frequency spectrum, achieving relatively high MAC efficiency.

In addition, a first device (a data receiving party) sends the contention frame, and the second device does not need to send a response frame, thereby reducing a signaling overhead of a system.

Further, the scheduling mode is used at each access point AP. However, in a scenario in which cooperative scheduling cannot be performed between APs, according to this embodiment of the present invention, some periods of time may be divided from some timeslots or each timeslot of a channel to perform contention. The scheduling information takes effect only when the contention succeeds. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that if the first device succeeds in contending, the second device obtains a sending opportunity and sends, according to the scheduling information, data to the first device in a first timeslot of a first channel. In this case, the scheduling information takes effect. Contrarily, if the first device fails to contend, the second device loses the sending opportunity this time. In this case, the scheduling information is invalid.

It should further be understood that in a WLAN network, the communications device may be an AP or a STA. Correspondingly, when the communications device acquires the scheduling information from the access point, the AP may acquire local scheduling information, or the STA may receive the scheduling information from the AP.

It should further be understood that a moment at which the communications device sends the contention frame is prior to a start moment of data transmission corresponding to the first timeslot of the first channel. In this way, the scheduling information takes effect only when the channel contention succeeds. For example, when the first timeslot is divided into two parts, that is, one part used for data transmission and the other part used for channel contention, contention needs to be completed before the start moment of the data transmission in the first timeslot.

Optionally, as an embodiment, the memory 1005 may further store an instruction for executing the following process: before the transmitter 1002 sends the contention frame, performing, by the communications device 100, random backoff or performing random backoff according to a service priority.

Optionally, as an embodiment, the memory 1005 may further store an instruction for executing the following process: if the receiver 1003 does not receive, from the second device, the data in the first timeslot of the first channel, requesting, by the processor 1004, the access point to perform rescheduling.

Figure 11:
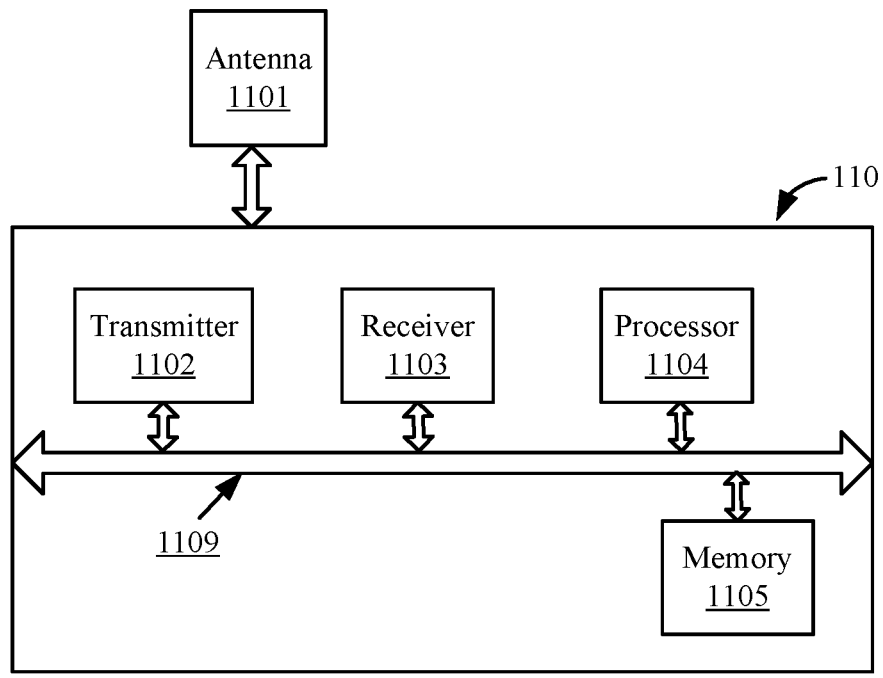
FIG. 11 is a schematic block diagram of a communications device according to another embodiment.

FIG. 11 is a schematic block diagram of a communications device according to another embodiment.

A communications device 110 in FIG. 11 may be configured to implement steps and methods in the foregoing method embodiments. In the embodiment of FIG. 11, the communications device 110 includes an antenna 1101, a transmitter 1102, a receiver 1103, a processor 1104, and a memory 1105. The processor 1104 controls an operation of the communications device 110, and may be configured to process a signal. The memory 1105 may include a read-only memory and a random access memory, and provide an instruction and data to the processor 1104. The transmitter 1102 and the receiver 1103 may be coupled to the antenna 1101. All components of the communications device 110 are coupled together by using a bus system 1109, where the bus system 1109 may further include a power bus, a control bus, and a status signal bus in addition to a data bus. However, for clarity of description, various buses are all marked as the bus system 110 in the figure. For example, the communications device 110 may be the AP 110 or the STA 120 shown in FIG. 1.

Specifically, the memory 1105 may store an instruction for executing the following processes: acquiring, by the processor 1104, scheduling information from an access point; receiving, by the receiver 1103, at least one contention frame; and if the transmitter 1102 is pre-scheduled by the access point according to the scheduling information to send data to at least one first device in a first timeslot of a first channel, and a sending device of the first contention frame received by the receiver 1103 belongs to a basic service set BSS in which the access point is located, sending, by the transmitter 1102, the data to the at least one first device in the first timeslot of the first channel.

In this embodiment, a scheduling mode and a contention mode are combined, and an access point may first perform pre-scheduling on a communications device. When a sending device of the first contention frame received by the communications device belongs to a BSS in which a same access point is located, the communications device sends data in a first timeslot of a first channel. This embodiment of the present invention provides a method for introducing a scheduling mode into a communications system that uses an unauthorized frequency spectrum, achieving relatively high MAC efficiency.

In addition, a first device (a data receiving party) sends a contention frame, and a second device does not need to send a response frame, thereby reducing a signaling overhead of a system.

Further, the scheduling mode is used at each access point AP. However, in a scenario in which cooperative scheduling cannot be performed between APs, according to this embodiment, some periods of time may be divided from some timeslots or each timeslot of a channel to perform contention. The scheduling information takes effect only when the contention succeeds, that is, when the sending device of the first contention frame received by the communications device belongs to the BSS in which the same access point is located. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that when a sending device of the first contention frame received by the second device belongs to the BSS in which the same access point is located, it indicates that the first device succeeds in contending, and the second device obtains a sending opportunity and sends, according to the scheduling information, the data to the first device in the first timeslot of the first channel. In this case, the scheduling information takes effect. Contrarily, the second device loses the sending opportunity this time. In this case, the scheduling information is invalid.

It should further be understood that in a WLAN network, the communications device may be an AP or a STA. Correspondingly, when the communications device acquires the scheduling information from the access point, the AP may acquire local scheduling information, or the STA may receive the scheduling information from the AP.

It should further be understood that, that the sending device of the first contention frame belongs to the BSS in which the access point is located means that the access point is a service access point of the sending device. For example, the sending device is associated with the access point.

Optionally, as an embodiment, the memory 1105 may further store an instruction for executing the following process: if the sending device of the first contention frame received by the receiver 1103 does not belong to the BSS in which the access point is located, keeping, by the transmitter 1102, silent in data transmission time of the first timeslot of the first channel.

Optionally, as another embodiment, the memory 1105 may further store an instruction for executing the following process: if the sending device of the first contention frame received by the receiver 1103 does not belong to the BSS in which the access point is located, requesting, by the processor 1104, the access point to perform rescheduling.

Optionally, as another embodiment, the memory 1105 may further store an instruction for executing the following process: when the transmitter 1102 keeps silent in the data transmission time of the first timeslot of the first channel, setting, by the processor 1104, a network allocation vector NAV according to the first contention frame, and within time corresponding to the NAV, skipping sending, by the transmitter 1102, the data on the first channel.

Optionally, as another embodiment, the memory 1105 may further store an instruction for executing the following process: determining, by the processor 1104 according to an address field of the first contention frame, whether the sending device of the first contention frame belongs to the BSS in which the access point is located.

Figure 12:
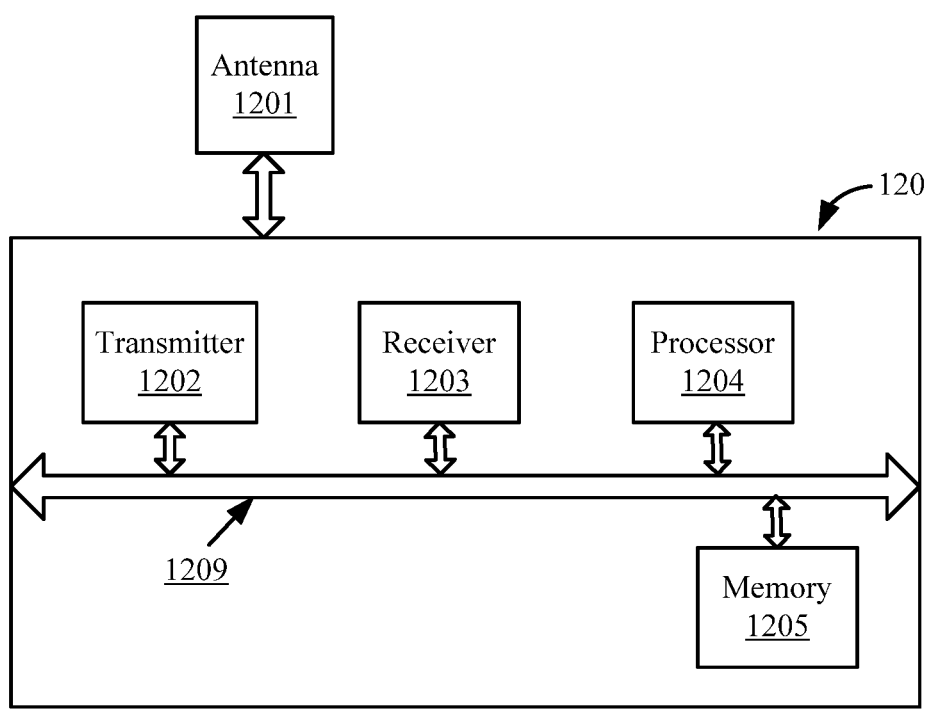
FIG. 12 is a schematic block diagram of a communications device according to another embodiment.

FIG. 12 is a schematic block diagram of a communications device according to another embodiment.

A communications device 120 in FIG. 12 may be configured to implement steps and methods in the foregoing method embodiments. In the embodiment of FIG. 12, the communications device 120 includes an antenna 1201, a transmitter 1202, a receiver 1203, a processor 1204, and a memory 1205. The processor 1204 controls an operation of the communications device 120, and may be configured to process a signal. The memory 1205 may include a read-only memory and a random access memory, and provide an instruction and data to the processor 1204. The transmitter 1202 and the receiver 1203 may be coupled to the antenna 1201. All components of the communications device 120 are coupled together by using a bus system 1209, where the bus system 1209 may further include a power bus, a control bus, and a status signal bus in addition to a data bus. However, for clarity of description, various buses are all marked as the bus system 1209 in the figure. For example, the communications device 120 may be the AP 110 or the STA 120 shown in FIG. 1.

Specifically, the memory 1205 may store an instruction for executing the following processes: acquiring, by the processor 1204, scheduling information from an access point; receiving, by the receiver 1203, at least one contention frame; and if the transmitter 1202 is pre-scheduled by the access point according to the scheduling information to send data to at least one first device in a first timeslot of a first channel, and a sending device of each contention frame of the at least one contention frame belongs to a basic service set BSS in which the access point is located, sending, by the transmitter 1202, the data to the at least one first device in the first timeslot of the first channel.

In this embodiment, a scheduling mode and a contention mode are combined, and an access point may first perform pre-scheduling on a communications device. When a sending device of a contention frame received by the communications device belongs to a BSS in which an access point associated with the communications device is located, the communications device sends data in a first timeslot of a first channel. This embodiment provides a method for introducing a scheduling mode into a communications system that uses an unauthorized frequency spectrum, achieving relatively high MAC efficiency.

In addition, a first device (a data receiving party) sends a contention frame, and a second device does not need to send a response frame, thereby reducing a signaling overhead of a system.

Further, the scheduling mode is used at each access point AP. However, in a scenario in which cooperative scheduling cannot be performed between APs, according to this embodiment, some periods of time may be divided from some timeslots or each timeslot of a channel to perform contention. The scheduling information takes effect only when the contention succeeds, that is, when a sending device of a contention frame received by the communications device belongs to a BSS in which an access point associated with the communications device is located. In this way, mutual interference between non-cooperative scheduling APs may be reduced, ensuring normal communication of a network. In addition, a quantity of devices that need to contend for a channel because the device is pre-scheduled to a same timeslot to perform data transmission is lower than a quantity of devices that need to contend for a channel in a non-scheduling scenario. Therefore, a system overhead brought by channel contention may be reduced.

It should be understood that when a sending device of each contention frame of at least one contention frame received by the second device belongs to a BSS in which a same access point is located, it indicates that the first device succeeds in contending, and the second device obtains a sending opportunity and sends, according to the scheduling information, the data to the first device in the first timeslot of the first channel. In this case, the scheduling information takes effect. Contrarily, the second device loses the sending opportunity this time. In this case, the scheduling information is invalid.

It should further be understood that in a WLAN network, the communications device may be an AP or a STA. Correspondingly, when the communications device acquires the scheduling information from the access point, the AP may acquire local scheduling information, or the STA may receive the scheduling information from the AP.

It should further be understood that, that the sending device of the contention frame belongs to the BSS in which the access point is located means that the access point is a service access point of the sending device. For example, the sending device is associated with the access point.

Optionally, as an embodiment, the memory 1205 may further store an instruction for executing the following process: if at least one sending device of the sending device that is of each contention frame of the at least one contention frame does not belong to the BSS in which the access point is located, keeping, by the transmitter 1202, silent in data transmission time of the first timeslot of the first channel.

Optionally, as another embodiment, the memory 1205 may further store an instruction for executing the following process: if at least one sending device of the sending device that is of each contention frame of the at least one contention frame does not belong to the BSS in which the access point is located, requesting, by the processor 1204, the access point to perform rescheduling.

Optionally, as another embodiment, the memory 1205 may further store an instruction for executing the following process: when the transmitter 1202 keeps silent in the data transmission time of the first timeslot of the first channel, setting, by the processor 1204, a network allocation vector NAV according to the at least one contention frame, and within time corresponding to the NAV, skipping sending, by the transmitter 1202, the data on the first channel.

Optionally, as another embodiment, the memory 1205 may further store an instruction for executing the following process: determining, by the processor 1204 according to an address field of each contention frame of the at least one contention frame, whether the sending device of each contention frame belongs to the BSS in which the access point is located.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   acquiring, by a first device, scheduling information from an access point, wherein the scheduling information indicates that the first device is scheduled to receive data from a second device during a first timeslot of a first channel;
   determining, by the first device according to the scheduling information, the first device is pre-scheduled to receive data from the second device during the first timeslot of the first channel;
   determining a start moment that occurs prior to a data transmission time corresponding to the first timeslot of the first channel; and
   in response to determining that the first device is pre-scheduled by the access point to receive data in the first timeslot of the first channel, and in response to determining that the start moment has occurred, sending, by the first device, a contention frame to contend for the first timeslot of the first channel, wherein the first device is configured to send a responsive contention frame each time it is determined that the first device has been pre-scheduled to receive data from the second device.

2. The method according to claim 1, further comprising:
   before sending the contention frame, performing, by the first device, random backoff or performing random backoff according to a service priority.

3. The method according to claim 1, further comprising:
   in response to the first device not receiving, from the second device, the data during the first timeslot of the first channel, requesting, by the first device, the access point to perform rescheduling.

4. The method according to claim 1, wherein the first device and the second device belong to a basic service set (BSS) in which the access point is located.

5. The method according to claim 3, further comprising:
   receiving, by the first device, new scheduling information from the access point; and
   sending, by the first device, a second contention frame during a second start moment, wherein the second start moment is determined according to the new scheduling information.

6. A method, comprising:
   acquiring, by a second device, scheduling information from an access point, wherein the scheduling information indicates the second device is scheduled to send data to a receiving device during a first timeslot of a first channel, and the receiving device is scheduled by the access point to receive the data from the second device during the first timeslot of the first channel, and wherein the second device belongs to a basic service set (BSS) in which the access point is located;
   determining, by the second device and according to the scheduling information, the second device is pre-scheduled to send data to the receiving device during the first timeslot of the first channel;
   receiving, by the second device from the receiving device, a first contention frame prior to a data transmission time corresponding to the first timeslot of the first channel, wherein the receiving device is configured to send a responsive contention frame each time that the receiving device has been pre-scheduled by the access point to receive data from the second device; and
   in response to determining the second device is pre-scheduled by the access point to send data to the receiving device in the first timeslot of the first channel, and in response to determining the receiving device belongs to the BSS, sending, by the second device, the data to the receiving device during the data transmission time.

7. The method according to claim 6, further comprising: in response to determining that the receiving device does not belong to the BSS, keeping, by the second device, silent during the data transmission time.

8. The method according to claim 7, further comprising: requesting, by the second device, the access point to perform rescheduling.

9. The method according to claim 7, wherein keeping silent during the data transmission time comprises:
determining, by the second device, a network allocation vector (NAV) according to the first contention frame; and
skipping sending, by the second device and during a time period corresponding to the NAV, the data on the first channel.

10. The method according to claim 6, further comprising: determining, by the second device according to an address field of the first contention frame, whether the receiving device belongs to the BSS.

11. A first device, comprising:
a receiver;
a transmitter;
a processor; and
a non-transitory computer-readable storage medium storing a program to be executed by the processor, the program including instructions for:
acquiring, using the receiver, scheduling information from an access point, wherein the scheduling information indicates that a second device is scheduled to send data to the first device during a first timeslot of a first channel;
determining, according to the scheduling information, the first device is pre-scheduled by the access point to receive data from the second device during the first timeslot of the first channel;
determining a first moment that occurs before a start moment of a data transmission time corresponding to the first timeslot of the first channel; and
in response to determining the first device is pre-scheduled to receive data, and in response to determining the first moment has occurred, sending, using the transmitter, a contention frame to contend for the first timeslot of the first channel, wherein the first device is configured to send a responsive contention frame each time it determines that the first device has been pre-scheduled to receive data from the second device.

12. The first device according to claim 11, wherein the program further includes instructions for:
performing random backoff or performing random backoff according to a service priority.

13. The first device according to claim 11, wherein the program further includes instructions for:
when the first device does not receive, from the second device, the data during the first timeslot of the first channel, requesting the access point, via the transmitter, to perform rescheduling.

14. The first device according to claim 11, wherein first device and the second device belong to a basic service set (BSS) in which the access point is located.

15. The first device according to claim 13, wherein the program further includes instructions for:
acquiring, by the receiver, new scheduling information from the access point; and
sending, by the transmitter, a second contention frame during a second start moment, wherein the second start moment is determined according to the new scheduling information.

16. A first device, comprising:
a receiver, configured to receive scheduling information from an access point, and to receive a first contention frame;
a transmitter;
a processor; and
a non-transitory computer-readable storage medium storing a program to be executed by the processor, the program including instructions for:
acquiring, from the receiver, the scheduling information, wherein the scheduling information indicates the first device is scheduled to send data to a receiving device during a first timeslot of a first channel, wherein the first device belongs to a basic service set (BSS) in which the access point is located;
determining, according to the scheduling information, the first device is pre-scheduled by the access point to send data to the receiving device during the first timeslot of the first channel;
receiving, by the receiver, a first contention frame from the receiving device prior to a data transmission time corresponding to the first timeslot of the first channel, wherein the receiving device is configured to send a responsive contention frame each time the receiving device determines it has been pre-scheduled to receive data from the receiving device; and
in response to determining that the first device is pre-scheduled by the access point to send data to the receiving device in the first timeslot of the first channel, and in response to determining the receiving device belongs to the BSS, sending, by the transmitter, the data to the receiving device during the data transmission time.

17. The first device according to claim 16, wherein the program further includes instructions for:
in response to determining that the receiving device does not belong to the BSS, keeping silent during the data transmission time.

18. The first device according to claim 17, wherein the program further includes instructions for:
requesting the access point, via the transmitter, to perform rescheduling.

19. The first device according to claim 17, wherein the program further includes instructions for:
determining a network allocation vector (NAV) according to the first contention frame; and
skipping sending the data on the first channel during a time period corresponding to the NAV.

20. The first device according to claim 17, wherein program further includes instructions for:
determining, according to an address field of the first contention frame, whether the receiving device belongs to the BSS.

* * * * *